United States Patent [19]

Aparicio et al.

[11] Patent Number: 5,292,707
[45] Date of Patent: Mar. 8, 1994

[54] IMPROVING THE DENSITY OF CARBON MOLECULAR SIEVES FOR THE STORAGE OF NATURAL GAS

[75] Inventors: Luis M. Aparicio, Madison, Wis.; Scott R. Keenan, Dover, N.J.; Li Wang, Bloomingdale, Ill.

[73] Assignee: Allied-Signal Inc., Morris Township, Morris County, N.J.

[21] Appl. No.: 981,702

[22] Filed: Nov. 25, 1992

[51] Int. Cl.$^5$ .................. C01B 31/02; C01B 31/08; B01J 20/30; B01J 20/20
[52] U.S. Cl. ...................... 502/418; 95/143; 502/416; 502/437; 502/526
[58] Field of Search ............... 502/416, 417, 418, 420, 502/433, 436, 437, 180

[56] References Cited

U.S. PATENT DOCUMENTS

| | | | |
|---|---|---|---|
| 4,163,090 | 7/1979 | Wiley et al. | 526/88 |
| 4,820,318 | 4/1989 | Chang et al. | 55/71 |
| 4,820,681 | 4/1989 | Chang et al. | 502/418 |
| 4,902,312 | 2/1990 | Chang | 55/75 |

OTHER PUBLICATIONS

Matranga et al., Chem. Eng. Sci., vol. 47, No. 7, pp. 1569–1579 (1992).

*Primary Examiner*—Paul E. Konopka
*Attorney, Agent, or Firm*—Harold N. Wells; Gerhard H. Fuchs; Mary Jo Boldingh

[57] ABSTRACT

Natural gas is stored in a closed vessel under a pressure of about 1400 to 4500 kPa using a carbon molecular sieve adsorbent. The deliverable volume of natural gas from a vessel packed with carbon molecular sieve particles is increased by raising the density of the polymer precursor of the carbon molecular sieve through adjustment of the conditions for suspension polymerization of vinylidene chloride.

8 Claims, No Drawings

IMPROVING THE DENSITY OF CARBON MOLECULAR SIEVES FOR THE STORAGE OF NATURAL GAS

BACKGROUND OF THE INVENTION

This invention relates to a method of storing natural gas. More particularly, the invention relates to storage of natural gas at near ambient temperatures using a solid adsorbent, in particular, a carbon molecular sieve.

U.S. Pat. No. 4,820,681 discloses an improved carbon molecular sieve which has a high capacity for carbon dioxide and may be characterized as hydrophobic, requires no binders, and may be carbonized in a single step.

Natural gas, being substantially methane, has a low molecular weight and it occupies a large volume per unit weight compared to liquid fuels. Thus, reducing the volume of natural gas is necessary for most practical applications of natural gas as a fuel. Methods for doing this could include (1) storage at high pressure, (2) liquefaction and storage at low temperatures, and (3) adsorption on solids. Of these methods the last is of particular interest since compact storage of natural gas at moderate pressures may be achieved, while avoiding the cryogenic temperatures needed for liquid natural gas of the high pressures needed for storage as a gas within reasonable size vessels.

Conventional activated carbons have been found to have reasonable capacity for natural gas but higher capacity is believed necessary for commercial success. Inorganic zeolites have also been tried, but found to have relatively low capacity for natural gas. Carbon molecular sieves also have been suggested for adsorption of natural gas. Improvements in the storage of natural gas have been disclosed in copending applications U.S. Ser. Nos. 07,906,995, 07/906,993 and 07/964,174.

The present inventors have found a method for increasing the packing density of carbon molecular sieves and thereby increasing the volumetric efficiency of the adsorption of natural gas. The invention relates to improvements in the suspension polymerization which provides a polymer precursor to such carbon molecular sieves. A discussion of suspension polymerization of vinylidene halides may be found, for example, in U.S. Pat. No. 4,163,090 to Dow Chemical Co.

BRIEF SUMMARY OF THE INVENTION

As disclosed in the co-pending applications mentioned above, natural gas is stored at near ambient temperatures and at pressures of about 100–900 psig (791 to 6305 kPa abs.) on a carbon molecular sieve. The carbon molecular sieves are particles characterized by having at least 60% of the total particle pore volume, consisting of micropores having diameters greater than 4 Å (0.4 nm) and less than 20 Å (2 nm). As initially formed the micropores have diameters substantially between 5 and 7 Å (0.5 and 0.7 nm) and have a slit-like shape. Larger pores may be created by an activation step. The carbon particles preferably are shaped as spheres, as cylinders having an aspect ratio of about 1/1, or as flat disks.

The carbon molecular sieve is derived from carbonization in an inert atmosphere of polymer, preferably vinylidene chloride. The carbonized polymer may be activated by heating in an atmosphere containing steam, carbon dioxide, or oxygen to optimize the pore size and to increase the micropore volume and thereby optimize the deliverable volume of natural gas.

The density of the carbon molecular sieve is increased according to the present invention by increasing the density of the polymer precursor of the carbon molecular sieve through improvements in the process of suspension polymerization. The increases in polymer density may be up to about 35% relative to polymers made according to the method disclosed in the co-pending applications. After carbonization, the densified polymer yields a more dense carbon molecular sieve, which provides increased packing density and greater deliverable capacity for natural gas.

The improvements to the polymerization of vinylidene chloride by suspension polymerization which improve the density of the polymer and the carbon molecular sieve include the selection and use of the polymerization initiators capable of maximizing polymer density. The preferred initiator is lauroyl peroxide, but related azo and peroxy carbonate initiators may be used, particularly members of the group consisting of 2,2'-azobis(4-methoxy-2,4-dimethylvaleronitrile), α-cumylperoxy neodecanoate, 2,2'-azobis(2,4-dimethyl valeronitrile), and benzoyl peroxide. Reaction conditions are adjusted to slow the reaction, particularly by regulating the temperature to assure that high yields of polymer are obtained, preferably near 100% conversion of the monomers. In general, the reaction temperature will be maintained between about 30° and 70° C. Another factor related to improved polymer density is the initial polymerization reactor pressure measured at ambient temperature, which should be greater than atmospheric and up to about 100 psia (689 kPa), although higher pressures could be used.

DETAILED DESCRIPTION OF THE INVENTION

Natural Gas Storage

An important potential use for natural gas is as a fuel for vehicles. It will be evident that the size and weight of the fuel tanks for such vehicles will be an important consideration. Conventional gasoline tanks provide efficient energy storage. However, storing natural gas efficiently is more difficult. The tanks must hold enough natural gas to provide an acceptable operating range and still not occupy too much space or add too much weight to the vehicle. Liquified natural gas occupies the least space, but requires a temperature of about −162° C., which is too low to be considered for most applications. High pressure natural gas, say in the range of 2000 psig (13.9 MPa abs.) to 3600 psig (25 MPa abs.), is feasible but the high pressures require heavy and expensive vessels which can be fueled only from rather expensive equipment. It is unlikely that such high pressure would be acceptable or feasible except for a captive fleet of short range vehicles which could be fueled at a central location. Lower pressures of about 300 psig (2,169 kPa abs.) to 900 psig (6,305 kPa abs.) are considered to present an optimum choice for natural gas fueled vehicles.

It has been shown that adsorbents may be useful for low pressure storage of natural gas and carbons have been found to have higher capacities for natural gas than other solid adsorbents such as zeolites, silica gel, and alumina. Even so, not all carbons have adequate capacity to meet the standards considered necessary for practical applications. The carbon molecular sieves of the present invention are superior to others and provide a higher capacity for natural gas. Another advantage for carbon compared to other adsorbents is its lower tendency to adsorb impurities in the natural gas which could decrease the storage capacity for the natural gas. Also, since the carbon molecular sieves of the invention are typically hydrophobic, they avoid loss of capacity resulting from adsorption of water as well as adsorption of $CO_2$ or other impurities.

Natural gas will be stored in the pores of the carbon and in spaces around the carbon particles. The optimum pore size for natural gas adsorption is believed to be about 4 to 12 Å (0.4 to 1.2 nm) since the pores do not just hold compressed gas, but cause the gas molecules to behave as if more highly compressed, that is, to have a higher density than the gas normally has at the storage pressure. Thus, it follows that the volume of such micropores in a carbon particle should be as large as possible to maximize gas storage. Gas in the void spaces around the carbon would be expected to have its normal density and therefore, these spaces should be minimized. Thus, the carbon should have the highest possible packing density. Another factor to be considered is the need to provide for access to the carbon so that the natural gas can be efficiently stored and recovered. For that purpose larger pores are believed to be needed, say about 20 to 500 Å (2 to 50 nm). These have been termed meso pores. Larger pores, i.e. above 500 Å (50 nm) are considered macro pores. In a vessel packed with carbon molecular sieve particles, natural gas can be stored in the micropores, the meso and macro pores, and in the void volume. Preferably the largest possible fraction of the volume should be in the micropores.

Carbon Molecular Sieves (CMS)

The carbon molecular sieves and activated carbons made by prior art methods using waste materials from the manufacture of Saran or other low cost feedstocks are considered inferior for the storage of natural gas since they have not been optimized for the desired properties.

Hydrophobic carbon molecular sieves (CMS) for the adsorption of natural gas are produced by a unique method. This method broadly comprises three steps: (1) polymerization of an oxygen-free monomer optionally but not preferably in the presence of a minor amount of an oxygen-free cross-linking agent; (2) forming particles of the resultant polymer into a desired shape; and then, (3) carbonizing the shaped material in a substantially oxygen-free environment, which may include carbon dioxide. The present invention relates to improvements in step (1), i.e. the polymerization of monomers, particularly to suspension polymerization.

The monomers should be readily polymerizable, essentially free of oxygen in their molecular structure and preferably consisting of hydrogen, a halogen, and carbon. Among the materials which may be employed as the monomer are acrylonitrile (AN), vinylidene fluoride (VDF), chlorotrifluoroethylene (HALAR), vinylidene chloride (VDC), mixtures of two or more monomers such as mixtures of vinylidene chloride and vinyl chloride, vinylidene chloride and acrylonitrile, and a mixture of styrene and divinylbenzene. Other monomers include vinyl fluoride, vinyl bromide, chlorinated ethylene, chlorofluoroethylene, vinyl chlorobenzene, vinylidene bromide and vinylidene-fluoride-chlorotrifluoro-ethylene. The preferred monomer is vinylidene chloride, most preferably alone, i.e. without a cross-linking agent.

The polymers produced in the initial polymerization step optionally may be cross-linked with a substantially oxygen-free cross-linking agent. The cross-linking agent will typically be present during the polymerization at a concentration equal to less than 10 mole percent of the monomer preferably less than 5 mol. %, and most preferably less than 1 mol. %. A preferred cross-linking agent is divinylbenzene. Other possible cross-linking agents include trivinyl benzene, divinyl acetylene, and divinyl sulfide.

Several methods of polymerization may be employed. Bulk polymerization is the direct conversion of liquid monomer to polymer in a reaction system in which the polymer remains soluble in its own monomer. Solution polymerization uses a solvent capable of dissolving the monomer, the polymer, and the polymerization initiator. Suspension polymerization and emulsion polymerization have also been used to produce materials having the same level of desired properties, contrary to the previous findings of U.S. Pat. No. 4,820,681. Precipitation polymerization and vapor phase polymerization may also be suitable.

In suspension polymerization, the monomer is dispersed rather than dissolved in the medium, with water being a typical suspension medium. In emulsion polymerization, a suspended particle of colloidal size will be the site of the polymerization. The initiator is dissolved in the monomer, the monomer is dispersed in water, and a dispersing agent is incorporated to stabilize the suspension formed.

As the production of carbon molecular sieves from polymers containing no oxygen is desired, the polymerization initiator heretofore has preferably been an oxygen-free compound. A carbon or azo rather than an oxygen initiator has been preferably used. One non-oxygen containing initiator commonly employed has been 2,2'-azobis(isobutyronitrile), (AIBN). The present invention includes the selection of an initiator, in particular, lauroyl peroxide (dodecanoyl peroxide), but alternatively, related azo and peroxy carbonate inhibitors may be used, including 2,2'-azobis(4-methoxy-2,4-dimethylvaleronitrile), α-cumylperoxy neodecanoate, 2,2'-azobis(2,4-dimethylvaleronitrile and benzoyl peroxide.

When suspension or emulsion polymerization is used, the monomer is usually suspended or emulsified in water. The ratio of the monomer to the suspending fluid is about 0.1–1. A suspending agent, such as hydroxypropyl methyl cellulose is added in amounts of about 0.1 to 2%. Related compounds may also be used such as poly vinyl alcohol and Polyox (WRPA 3154) from Union Carbide.

For ease in fabricating the polymer into a desired shape, it may be reduced in size to small free-flowing particles, which may be shaped into a desired configuration by conventional means. A preferred form is a cylindrical pellet having an aspect ratio (diameter×height) of about 1/1. When suspension polymerization is used, the polymer is produced as spherical particles which may not require additional shaping and may be carbonized directly. It is a feature of the present invention that the density of the carbon molecular sieves produced via suspension polymerization have significantly improved density even without pelletization.

Improvements to the capacity of carbon molecular sieves may include increased packing density, i.e. g/mL. For a given porosity the more carbon which can be packed into a given volume the greater the amount of natural gas which can be adsorbed. Increased packing density can be achieved by interspersing small particles in the spaces between larger particles, as discussed in co-pending patent application U.S. Ser. No. 07/906,993. A convenient source of such small particles is the spherical polymer beads produced by suspension polymerization. These beads are carbonized and used to increase packing density. However, since they are not compressed into pellets they are less dense. In U.S. Ser. No. 07/964,174 it was shown that the density can be increased by impregnation of additional monomer and polymerization initiator into the polymer, then polymerizing the added monomer and repeating the procedure until the desired density is obtained. An increase of up to about 135% of the original polymer density can be obtained. After carbonization, this increased density is retained in the carbon molecular sieve and significantly improves the capacity for natural gas.

The present invention relates to the new discovery that density of the polymer beads produced during suspension polymerization of vinylidene chloride can be significantly increased by improvements to the polymerization process. More specifically, we have found that the polymer density can be increased by controlling the rate of polymerization through selection of the initiator and adjusting the reaction conditions to slow the reaction and assure that high yields of polymer are obtained. High yields have been found to provide increased density of the polymer and thereafter the carbon molecular sieve. The preferred initiator is lauroyl peroxide, but related azo and peroxy carbonate initiators may be used, particularly members of the group consisting of 2,2'-azobis(4-methoxy-2,4-dimethylvaleronitrile), α-cumylperoxy neodecanoate, 2,2'-azobis(2,4-dimethyl valeronitrile), and benzoyl peroxide. The reaction is preferably slowed by adjusting the temperature. In general, the reaction will be carried out at temperatures between about 30° and 70° C. Another factor in obtaining high polymer density is the initial pressure in the polymerization reactor (measured at ambient temperature) which preferably should be above atmospheric pressure and up to about 100 psia (689 kPa), although higher pressures could be used.

The polymeric material is carbonized by heating to a high temperature in the presence of an inert gas such as nitrogen or helium. As will be discussed below, the addition of carbon dioxide will have the effect of increasing the average pore size of the resulting carbon. The concentration of oxygen in the atmosphere surrounding the particles undergoing carbonization should be less than 0.1 mole percent and is preferably less than 0.05 mole percent. The carbonization will result in the evolution of a hydrogen halide. Preferably the inert gas should be flowing at a sufficient rate to remove this material from the particles. It is preferred that prior to high temperature carbonization the polymer be heated slowly in the range of 140°-180° C. (preferably about 2° to 10° C./hr) and held at this temperature for several hours. The polymer is then preferably subjected to a programmed temperature increase to a temperature above 700° C. The temperature is preferably raised at a rate greater than 50° C. per hour but less than 200° C. per hour. It is preferred to hold the final temperature for a period of at least 45 minutes and preferably for at least one hour. A preferred rate of programmed heating is 75°-125° C. per hour. The highest temperature is normally required for less than 5 hours. The required holding period can be determined by weight loss measurements.

Only a single carbonization step is needed. The second carbonization step of some prior art methods is not required. The second carbonization step of the prior art is done after the product of the first carbonization has been pulverized, admixed with a binder or other material such as coal tar pitch or high carbon content material and then shaped again.

Since the sieve precursors are derived from polymeric materials and include no binders, they are substantially free of the inorganic materials such as metals and inorganic oxides which may be present when the precursor material is made from a naturally occurring substance such as coal, coconut shells, peat, or wood. Materials which contain a binder will normally have impurities derived from the binder in addition to impurities present in the precursor materials. After carbonization on a hydrogen- and oxygen-free basis, the product should contain at least 99.5 wt. % carbon and preferably at least 99.8 wt. % carbon, excluding any material applied as a surface treatment or coating.

The polymeric material will shrink during the carbonization step in a proportional manner along each dimension. A cylindrical pellet will lose approximately 70 percent of its weight and size during the carbonization procedure due to the evolution of hydrogen chloride, hydrogen bromide, or hydrogen fluoride or a mixture of these gases. For PVDC-based precursors, the final carbonized material will often equal about 25 to 28 weight percent of the initial or starting polymerized material. The density of the initial material and the final carbonized material are related. That is, the density measured in terms of grams per mL of the finished carbon molecular sieves is dependent on the density of the initial uncarbonized polymer and the carbonization process conditions. Thus, when the polymer density is increased, as in the present invention, the carbon molecular sieve produced also has an increased density.

The carbon molecular sieves of the invention as produced are hydrophobic rather than hydrophilic and thus do not preferentially adsorb water which may be present in natural gas.

Activation

The carbon molecular sieves typically will be activated to optimize their capacity although such a process is not essential to the present invention. The term "activation" has been used in connection with processes intended to improve the adsorptive capacity of carbons and will be used in the present discussion to avoid confusion. However, the term "activation" often refers to the chemical treatment of a solid to change its active form, as in the activation of catalyst precursors. In the present instance, "activation" is considered to be the removal of a portion of the carbon which increases the total pore volume of particles and the size of the pores. Thus, it might be more properly termed an adjustment or optimization of the pores rather than a change of the chemical nature of the carbon.

When a precursor material is carbonized, the pores formed may not be the most desirable size and the total pore volume of a particle may be less than the maximum possible. Ideally, one would want to achieve the largest pore volume consistent with the necessary structural integrity. The pores themselves should have a size which provides the maximum adsorptive capacity.

It is believed that the optimum size for the pores of their carbon molecular sieves will be between 4 and 12 Å (0.4–1.2 nm). In carbon made from polyvinylidene chloride the pore size range is very narrow, that is, about 4-6 Å (0.4-0.6 nm). It has been found that the capacity for methane storage is significantly increased if the pore size is enlarged. If for simplicity one considers the pores being gradually enlarged, then it will be intuitively recognized that the capacity of each pore will be increased until some limit is reached. At some point it would be expected that so much carbon would be removed that the structural integrity of the carbon would be lost and the carbon would collapse with a consequent loss of pore volume. However, another factor must be considered. The pores are understood to be more than containers for gaseous methane, they are considered to cause the methane molecules to be held within the pores in closer proximity than in the gas phase. It is this phenomenon which provides an advantage for the use of adsorbents such as carbon, otherwise one might as well simply use an empty container, which would have a larger capacity than when filled with carbon. This quasi-condensation of methane in the pores will have its maximum effect at some pore size. Matranga et al. in Chem. Eng. Sci., Vol. 47, No. 7, pp. 1569-1579 (1992) assume in their calculations that a width equal to two molecules of methane provides the optimum performance, or a pore size of about 11 Å (1.1 nm). It is apparent that whether or not their assumption is correct, that one would expect that the pore size could not be increased indefinitely without losing capacity for methane. If a method were available for increasing the pore size uniformly, it should be possible to identify for any given carbon the optimum pore size. However, since most carbons have non-uniform pores to some extent, it would be expected that the actual optimum for each carbon would have to be determined experimentally. In part, the optimum size may be affected by the larger meso and macro pores which are not considered to hold methane as effectively as the micropores, but may assist the gas in entering or leaving those pores.

Since in many cases, it will be necessary to remove carbon to increase the size of the pores produced by the carbonization of the PVDC precursor polymer, gas phase reactions which can remove carbon are used. For example, steam, carbon dioxide, and oxygen have been suggested for this purpose. Each reaction produces carbon oxides, which are volatile and easily removed from the carbon. However, the location of the attack on the carbon is incompletely understood. For example, the reaction of carbon dioxide on the present carbon molecular sieves is to increase the pore volume in a non-linear manner. That is, the pore size distribution is broadened. It would be expected that a carbon having a wider distribution of pore sizes than that of the present carbon mole sieves would become even less well defined after undergoing an activation process. Thus, there is an advantage in beginning with a sharply defined pore size.

A process for activating carbon molecular sieves by removing carbon must involve a number of factors. As suggested above one would attempt to selectively increase the pore size so that the optimum total pore volume and pore size distribution is achieved. The temperature at which the reactive gas contacts the carbon will be of particular importance. Preferably the temperature will be at least 750° C. In some cases, it may be desirable to use staged temperatures where more than one contacting step is used. As with many chemical reactions the time at which the reactive gas is in contact with the carbon will have to be considered. The concentration of the reactive gas could be an important factor in determining the rate at which the carbon is removed. It may desirable to vary the concentration during the process or it may be preferred to carry out the activation process in a series of steps so that the process can be more readily controlled. It has been found that activation can be carried out to optimize the pores of the carbon molecular sieves so that the amount of natural gas adsorbed at pressure and then delivered at 0 psig is maximized. This is contrary to the conclusion of some workers in the art.

EXAMPLE 1

Comparative

A carbon molecular sieve was made by suspension polymerization using only vinylidene chloride (VDC). 92 g of commercial grade VDC (PPG Industries, Inc.) were passed through 20 mL of PCB activated carbon to remove the inhibitor content. Then 0.116 g of azobisisobutytonitrile (AIBN) was dissolved in the VDC. The VDC was then slowly added to 562 g of an aqueous solution containing 0.3% hydropropyl methyl cellulose and agitation of a 1000 mL Parr reactor was begun at 200 rpm. The vessel containing the mixture was held in a constant temperature bath at 70° C. under reflux conditions for about 8 hours, to complete the polymerization of VDC. The polymer was produced as spherical beads of about 300 μm diameter. These were recovered, washed with water, and air dried at room temperature. The particle density was measured by the mercury intrusion method and found to be 1.06 g/mL. The VDC polymer was pelletized to about 3.2 mm diameter and 3.2 mm height. Samples of the polymer were carbonized in a flowing stream of nitrogen. The temperature was raised from 25° to 175° in 30 min. to 2 hours and held for 2-4 hours. It was then increased at a rate of 100° C. per hour to 700° C. and held for 2 hours before the product was allowed to cool to room temperature.

EXAMPLE 2

The suspension polymerization of Example 1 was repeated using lauroyl peroxide as the polymerization initator rather than AIBN. 92 g of commercial grade VDC was passed through 20 mL of PCB activated carbon to remove the inhibitor content. Then 1.03 g of lauroyl peroxide (1.2 wt. %) was dissolved in the VDC and the VDC added to 562 g of an aqueous solution containing 0.3% hydropropyl methyl cellulose with agitation in a 1000 mL Parr reactor. The temperature was held at 50° C. under reflux conditions for about 24 hours to complete the polymerization of VDC. The polymer beads were recovered, washed with water, and air dried at room temperature as in Example 1. The particle density was measured and found to be 1.32 g/mL, an increase of 25% over the particle density of Example 1.

EXAMPLE 3

The polymerization reaction described in Examples 1 and 2 was repeated to evaluate the effect of reactor pressure. The previous examples began with atmospheric pressure, which increased as the reaction mixture was heated and then decreased as polymerization consumed the liquid VDC. In these experiments the initial reactor pressure (i.e. before heating) was varied by pressuring with nitrogen. 1213 g of VDC was passed through 100 mL PCB carbon to remove the inhibitor. 1.213 g of AIBN (0.1 wt. %) was added to the VDC and then added to 3000 g of aqueous solution containing 0.05 wt % hydroxypropyl methyl cellulose with agitation in a 2-gallon (7,570 mL) autoclave reactor, which was held at 70° C. with refluxing for 8 hours. A series of tests was then carried out with 14.556 g of lauroyl peroxide (1.2 wt %) or 1.213 g of AIBN and the reactor maintained at 50° C. beginning with pressure of 200, 300, and 500 psig (1379, 2068, and 3,447 kPa gauge). The particle density achieved was measured and found to increase depending on the reactor pressure. These results are shown in the following table, compared to reaction at atmospheric pressure with refluxing.

TABLE A

| Initial Reactor Pressure | Piece Density (g/mL) | |
|---|---|---|
| psia (kPa) | AIBN | LAP |
| 14.7 (101) | 1.06 (Ex. 1) | 1.32 (Ex. 2) |
| 14.7 (101) | 1.09 (Ex. 3) | — |
| 214.7 (1480) | 1.19 (Ex. 3) | 1.40 (Ex. 3) |
| 314.7 (2170) | 1.17 (Ex. 3) | 1.38 (Ex. 3) |
| 514.7 (3549) | 1.29 (Ex. 3) | 1.40 (Ex. 3) |

EXAMPLE 4

The polymerization of Example 2 was repeated on a larger scale. 250 g of VDC was passed through 40 mL PCB carbon to remove the inhibitor. Then 1.25 g of lauroyl peroxide (0.5 wt. %) was dissolved in the VDC and the VDC added to 1600 g of an aqueous solution of 0.25 wt. % hydroxy propyl methyl cellulose with agitation in a 2000 mL autoclave reactor, which was pressured with nitrogen to 60 psig (413 kPa gauge). The reactor was heated to 55° C. and held there for about 24 hours to complete the polymerization of the VDC. The particle density was found to be 1.41 g/mL.

EXAMPLE 5

The conditions of Example 4 were repeated except that the concentration of lauroyl peroxide was 0.25 wt. % and the temperature was held at 55° C. for 13 hours, then raised to 60° C. for 6 hours, to 65° C. for 3 hours, and to 70° C. for 3 hours. The particle density was found to be 1.41 g/mL.

EXAMPLE 6

Measurement of the methane capacity of the carbonized beads was carried out in stainless steel containers having volumes of 40 mL. The beads made by suspension polymerization were pelletized and carbonized and then packed into the container using an electric vibrator to obtain the maximum packing density. The container was evacuated to 1 m torr (0.001 mm Hg) and heated to 175° C. for 4 hours. After cooling to room temperature, the weight of the container and contents was measured and then it was pressured with methane gas at 500 psig (3447 kPa gauge). The temperature was measured by a thermocouple placed in the center of the bed of pellets. After equilibrium was reached, the container was weighed again and the total methane uptake determined. This includes methane in the micropores, the meso and macro pores, and the void space between pellets. The results of these experiments are summarized in the table below. The methane capacity shown in Table B represents the deliverable quantity when methane is discharged to 1 atmosphere at room temperature. The (v/v)d is based solely on the volume of the carbon particles and does not include the void space between the particles.

TABLE B

| Initiator | Initial Pressure (psig) | Polymer Bead Density (g/cc) | Polymer Pellet Density (g/cc) | Carbon Pellet Density (g/cc) | Carbon Methane Capacity (V/V)d |
|---|---|---|---|---|---|
| AIBN | 0 | 1.05 | 1.54 | 0.97 | 108 |
| AIBN | 0 | 1.09 | 1.57 | 1.05 | 115 |
| AIBN | 150 | 1.18 | 1.56 | 1.05 | 119 |
| AIBN | 150 | 1.19 | 1.58 | 1.07 | 117 |
| AIBN | 500 | 1.29 | 1.70 | 1.09 | 122 |
| LAP | 150 | 1.40 | 1.73 | 1.11 | 125 |
| LAP | 500 | 1.40 | 1.77 | 1.12 | 129 |

It can be seen that by selection of the initiator and adjusting the reaction conditions both the polymer precursor density and that of the carbon molecular sieve can be increased. The methane storage capacity is increased as the carbon molecular sieve density is increased.

What is claimed:

1. In the method of preparing a carbon molecular sieve by carbonizing a precursor polymer made by suspension polymerization of vinylidene chloride the improvement comprising increasing the density of said precursor polymer by using peroxy carbonate initiators for polymerization capable of maximizing polymer density and using an initial reaction pressure above atmospheric.

2. The method of claim 1 wherein the precursor polymer density is increased up to about 35% relative to the polymer density in the absence of the selected initiators.

3. The method of claim 1 wherein said precursor polymer is free of a crosslinking agent.

4. The method of claim 1 wherein said polymerization initiator is selected from the group consisting of lauroyl peroxide, α-cumyl peroxy neodecanoate, and benzoyl peroxide.

5. The method of claim 4 wherein said initiator is lauroyl peroxide.

6. The method of claim 1 wherein said polymerization is carried out with an initial reaction pressure at ambient temperature above atmospheric pressure and up to about 100 psia (689 kPa).

7. The method of claim 6 wherein the conditions for polymerization are adjusted to slow the reaction and increase the yield of said polymer.

8. The method of claim 7 wherein the reaction is slowed by adjusting the reaction temperature between about 30° and 70° C.

* * * * *